Sept. 13, 1932.  F. WAGNER  1,877,542
BALANCED VALVE
Filed Sept. 13, 1930
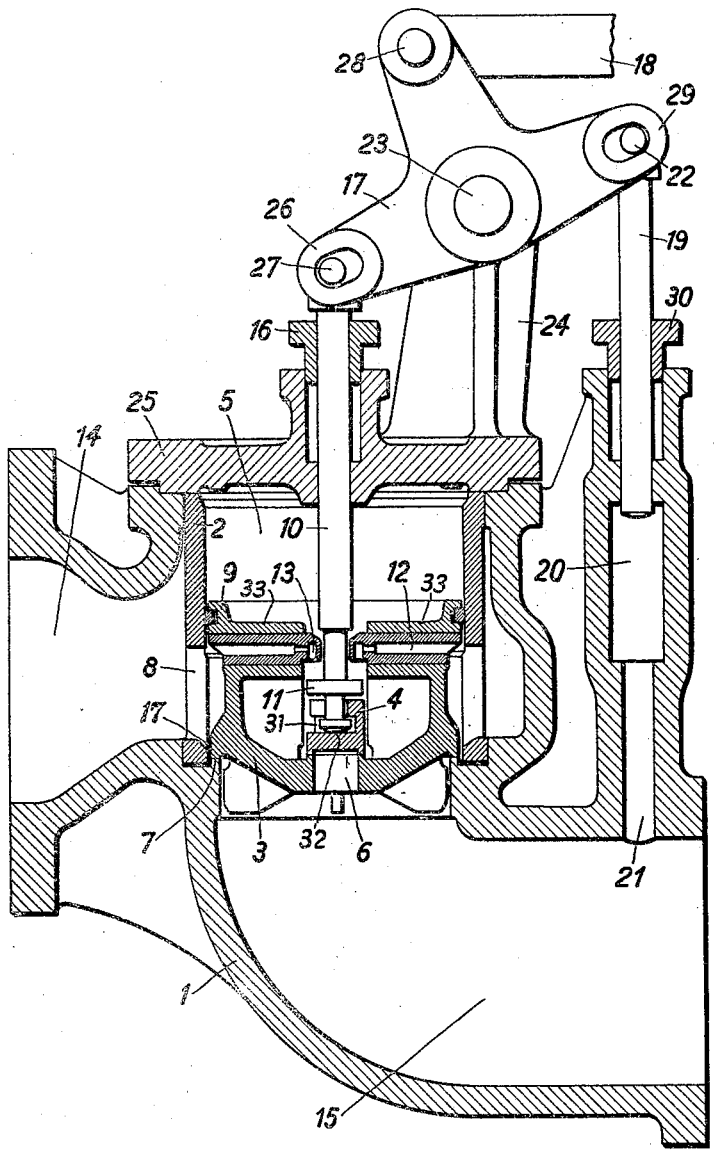

Patented Sept. 13, 1932

1,877,542

UNITED STATES PATENT OFFICE

FRITZ WAGNER, OF BERLIN-LICHTERFELDE, GERMANY

BALANCED VALVE

Application filed September 13, 1930, Serial No. 481,767, and in Germany January 4, 1929.

My invention relates to balanced valves having a main and an auxiliary valve.

It is an object of my invention to relieve the auxiliary valve. To this end I provide an equalizing piston in operative connection with the auxiliary valve, which piston is acted on by the fluid under pressure in the discharge conduit of the two valves, and is so connected to the spindle of the auxiliary valve so as to move in opposite direction to the auxiliary valve.

Preferably, the diameter of the equalizing piston is equal, or substantially equal, to the diameter of the spindle.

In the accompanying drawing a valve embodying my invention is illustrated by way of example in section in the axis of its spindle.

Referring now to the drawing the valve proper is designed as described in my co-pending application for patent of the United States, Ser. No. 162123, filed January 19, 1927 now Patent 1,833,062 but obviously I am not limited to this type of valve.

A valve as described in the said co-pending application comprises a casing 1, with a liner 2 for the main valve 3, and a seat for the axiliary valve 4 in the bottom of the main valve, an equalizing chamber 5, a discharge bore 6 below the seat of the auxiliary valve 4 in the main valve 3, a seat 7 for the main valve 3 in the casing 1, slots 8 in the liner 2 for admitting fluid under pressure which may be steam, to the seat 7, a balancing piston 9 on the main valve which is fitted to slide in the liner 2 and is equipped with packing rings, a valve spindle 10 with a dog 11, supply pipes 12 in the main valve 3 with openings or perforations 13 at their inners ends which are adapted to be throttled by the dog 11, as and for the purpose described in my said co-pending application, a supply conduit 14 for the fluid under pressure, and a discharge conduit 15 which connects the valve seat 7, say, with the dry pipe of a locomotive engine.

As described in my said co-pending application, the valve has two throttling devices. The first device is arranged within the hollow main valve and includes the perforations 13 at the inner ends of the supply pipes 12 and the dog 11 on the spindle 10, and the second throttling device is a narrow clearance 17 ahead of the seat 7 of the main valve 3 intermediate the lower end of liner 2 and the lower end of the main valve 3.

The throttling device within the main valve so controls the flow of live steam to the cavity of the main valve and the equalizing chamber 5 through the supply pipes 12 that the main valve moves in the same direction and at the same velocity as the spindle 10, stops when the spindle is arrested, and moves on with the spindle if the latter is restarted. The throttling device ahead of the main valve seat 7, the clearance 17, reduces to a minimum the opening acceleration of the main valve and prevents chattering.

The problem is that the auxiliary valve 4 should close as easily as it opens. There is no difficulty about opening the valve, provided the spindle 10 is made thick enough. But the difficulty is to close a valve with such a thick spindle.

The problem is solved as follows: The spindle 10 is not secured on the auxiliary valve 4 but inserted loosely in a slot or cavity 31 of the valve and equipped with a spherical head 32 at its lower end which bears on the bottom plate of the auxiliary valve. The depth from the top plate of the head to the point where it bears on the bottom plate of the auxiliary valve, is such that the top of the head is somewhat below the face on the auxiliary valve it engages with when the base of the head is on the bottom plate of the valve. The head and the bottom plate make point contact only and therefore the fluid under pressure, normally steam, has free access to the lower end of the spindle 10. Therefore, when the main and auxiliary valves are closed, the pressure in the equalizing chamber 5 while exerting a downwardly directed force on the auxiliary valve 5, exerts upwardly directed thrust on the spindle. As mentioned, it is easy to make the spindle 10 so thick that the thrust balances the force, even for the largest auxiliary valves and the highest pressures. But it would be very hard to close the auxiliary valve against the excessive thrust acting on its thick spindle. This difficulty is eliminated by the means which will now be described—

17 is a T lever which is fulcrumed at 23 in a suitable upright 24 on the cover 25 of the casing 1, 16 is a stuffing box through which the spindle 10 leaves the cover 25, and 26 is a slotted eye at one end of the T lever 17 which engages a pin 27 on the spindle 10. 28 is a pin on the central arm of the T and 18 is the operating rod which is linked to the pin 28.

29 is a slotted eye at the end of the T which is opposite the eye 26, and 19 is the equalizing piston which is connected with the eye 29 by a pin 22. The diameter of this piston, as mentioned, is preferably equal, or substantially equal, to the diameter of the spindle 10. 20 is the cylinder of the equalizing piston, 21 is a duct connecting the cylinder with the discharge conduit 15, and 30 is a stuffing box at the upper end of the cylinder.

In the position illustrated, with the main and auxiliary valves closed, fluid under pressure, normally steam, from the pipe 14 is admitted to the pipes 12 in the main valve 3 through the ports 8 in the liner 2. The pipes 12 are inserted in radial arms 33 of the main valve 3, with their inner ends projecting toward the spindle 10 from the inner ends of the arms. The lower faces at their inner ends in which the perforations 13 open, are flattened and extend at right angles to the axis of the spindle 10 while the perforations 13 are parallel to the axis. The upper face of the dog or collar 11 which may be secured on, or made integral with, the spindle 10, is so pitched with respect to the seating face of the auxiliary valve 4 that when the auxiliary valve is on its seat the distance from the upper face to the flattened end portions of the pipe 12 is more than ¼ the inside diameter of the bore 6 below the auxiliary valve. The auxiliary valve 4 is loaded by the pressure in the equalizing chamber 5 but relieved by the upwardly directed force acting on the spindle 10. From the moment when the auxiliary valve opens, to the moment when the auxiliary valve, on its closing stroke has moved nearer to its seat above the bore 6 than ¼ of the inside diameter of the bore, and now, begins to throttle the bore 6, uniform pressure prevails in the equalizing chamber 5, in the conduit 15, and in the cylinder 20 of the equalizing piston 19. While the auxiliary valves 4 on its downstroke increasingly throttles the bore 6, and finally closes it, the pressure in the discharge conduit 15 falls to zero while pressure builds up in the equalizing chamber by the pressure of the steam from pipes 12. The upward thrust on the spindle 10 moves up the spindle until its head 32 engages below its abutment on the auxiliary valve and then is balanced by the downwardly directed force on the auxiliary valve. The equalizing piston 19 has no influence for the present as there is no pressure in its cylinder 20.

Conditions consequently are as follows:

1. If the main and auxiliary valves are closed upward thrust acts on the spindle 10 which balances the downward force on the auxiliary valve.

2. While the auxiliary valve 4 is at a distance from its seat which is greater than ¼ of the inside diameter of bore 6, that is, while the fluid flows freely in the bore 6 and has free access to the cylinder 20 of the equalizing piston 19, the upward thrust on the spindle 10 is balanced by the upward thrust on the piston 19 through lever 17.

3. While the flow of the fluid in the bore 6 is throttled, that is, while the distance of the auxiliary valve from its seat is less than ¼ the diameter of bore 6, the upward thrust on the spindle 10 is increased by the pressure building up in the equalizing chamber 5 but is balanced by the increase of the downwardly directed force exerted on the auxiliary valve by the same pressure.

It will appear that in this manner in a valve of the type referred to which may be of the general design described in my said copending application, in which the main valve is controlled by fluid under pressure under the action of the throttling device in the main valve, and chattering of the main valve is prevented by the throttling device 17 ahead of its seat, even the largest auxiliary valves under the highest pressure will open and close easily throughout the spindle stroke, and be arrested at any point intermediate the final positions of the spindle by removing the force acting on the operating rod 18.

I claim:

1. A balanced valve having a main and an auxiliary valve, a conduit for receiving the fluid from said two valves, a spindle operatively connected to said auxiliary valve, and an equalizing piston which is acted on by the fluid in said conduit and operatively connected to said spindle so as to move in opposite direction to said auxiliary valve.

2. A balanced valve having a main and an auxiliary valve, a conduit for receiving the fluid from said two valves, a spindle operatively connected to said auxiliary valve, a throttling device in a cavity of said main valve including a fluid supply member and a member on said spindle adapted to control the flow of fluid from said supply member; another throttling device, being a narrow clearance ahead of the seat of said main valve, and an equalizing piston which is acted on by the fluid in said conduit and operatively connected to said spindle so as to move in opposite direction to said auxiliary valve.

In testimony whereof I affix my signature.

FRITZ WAGNER.